United States Patent
Flynn et al.

(10) Patent No.: US 7,206,146 B2
(45) Date of Patent: Apr. 17, 2007

(54) BIPHASE MAGNETIC PATTERN DETECTOR USING MULTIPLE MATCHED FILTERS FOR HARD DISK DRIVE

(75) Inventors: David Timothy Flynn, Mantorville, MN (US); Richard Galbraith, Rochester, MN (US); Travis Roger Oenning, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 405 days.

(21) Appl. No.: 10/974,075

(22) Filed: Oct. 27, 2004

(65) Prior Publication Data

US 2006/0087757 A1   Apr. 27, 2006

(51) Int. Cl.
G11B 5/09 (2006.01)
(52) U.S. Cl. .................... 360/39; 375/343; 375/282; 375/333; 375/361
(58) Field of Classification Search ............... None
See application file for complete search history.

(56) References Cited

U.S. PATENT DOCUMENTS

| 5,255,131 | A | * | 10/1993 | Coker et al. ............... 360/48 |
| 5,283,531 | A | | 2/1994 | Serizawa et al. ........... 329/316 |
| 5,661,760 | A | * | 8/1997 | Patapoutian et al. ........ 375/341 |
| 6,031,672 | A | | 2/2000 | Bergquist et al. ............ 360/46 |
| 6,680,807 | B1 | * | 1/2004 | She et al. .................... 360/51 |
| 6,927,932 | B1 | * | 8/2005 | Schell et al. ................. 360/85 |
| 2002/0069379 | A1 | * | 6/2002 | Reed et al. ................... 714/54 |
| 2004/0047268 | A1 | | 3/2004 | Yanagisawa et al. .. 369/112.02 |
| 2004/0228019 | A1 | * | 11/2004 | Annampedu et al. ......... 360/39 |
| 2005/0254160 | A1 | * | 11/2005 | Bandic et al. ........... 360/77.08 |

OTHER PUBLICATIONS

"Cauch-Schwarz Inequality", M. Haag and J. Romberg. Connexions Rice University website article. Feb. 7, 2004.
"Analysis of a Biphase-Based Servo Format for Hard-Disk Drives", K. Makinwa, J. Bermans and J. Voorman. IEEE Transaction on Magnetics, vol. 36, No. 6, pp. 4019-4027. Nov. 2000.

* cited by examiner

Primary Examiner—Andrea Wellington
Assistant Examiner—Dan I Davidson
(74) Attorney, Agent, or Firm—John L. Rogitz

(57) ABSTRACT

A hard disk drive (HDD) holds data using a biphase scheme. A plurality of matched filters are used to detect binary data represented by the biphase pattern without the need for synchronous sampling or equalization.

19 Claims, 4 Drawing Sheets

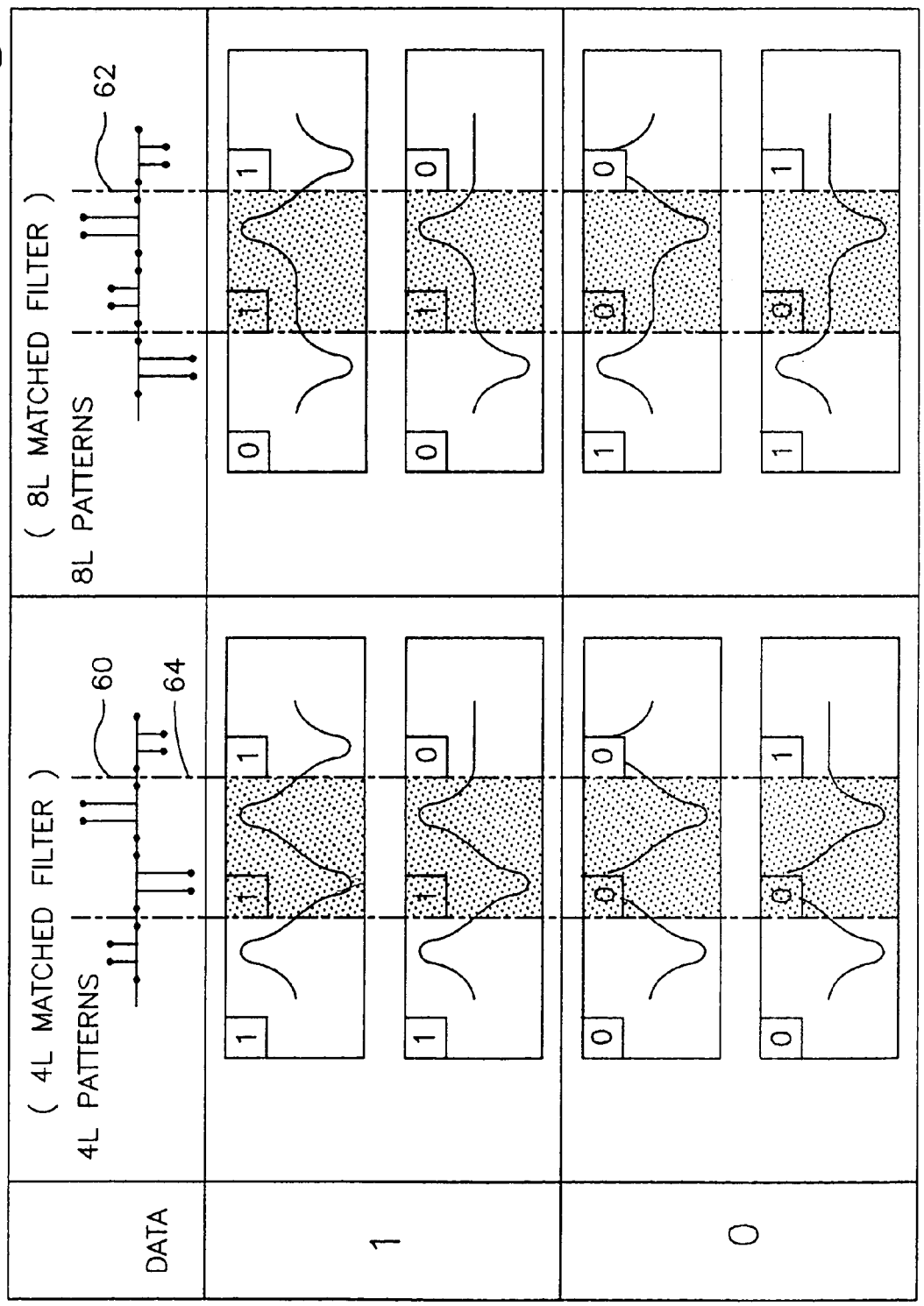

BIPHASE MAGNETIC PATTERN DETECTOR USING MULTIPLE MATCHED FILTERS FOR HARD DISK DRIVE

FIELD OF THE INVENTION

The present invention relates to hard disk drives.

BACKGROUND OF THE INVENTION

Magnetic disk drives use servo patterns to encode information for positioning the read/write heads. These servo patterns are typically written as wedge-shaped sectors extending in the radial direction from the inner diameter of the disk to the outer diameter of the disk. Because the disk area reserved for servo information is area that cannot be used for storing user data, there is great value in making the servo area as small as possible. This invention addresses the common problem of how to encode and detect servo information (i.e., numerical servo data used for positioning) as well as customer data at the highest possible density with adequate signal-to-noise ratio (SNR).

One method for encoding numerical servo data is known as dibit encoding, in which a binary "1" is encoded as a pair of magnetic transitions while a binary "0" is encoded as the absence of any transitions. Dibit encoding, unfortunately, has two disadvantages related to the fact that only one symbol carries energy. First, because there is no timing content on the "0" symbol, the format typically requires the addition of "dummy dibits" to protect against long runs of zeros during which no timing recovery is possible, reducing the overall space efficiency of the pattern. Second, the SNR rendered by dibit encoding is suboptimal because the "0" symbol contains no energy. As understood herein, symbols which are very different from each other are more easily distinguished by the detector, but the "1" and "0" symbols for the dibit pattern are different for only half of the detection cell.

Accordingly, to overcome the above-noted disadvantages, data can be encoded using biphase encoding, in which a binary "1" is encoded as a pair of magnets, while a binary "0" is encoded as a pair of magnets of the opposite polarity. A matched filter can be used to determine correlation of the "1" and "0" symbols. It is to be appreciated that unlike dibit encoding, the biphase pattern carries energy in both symbols, resulting in a greater difference, i.e., detection distance, between the two symbols.

As critically recognized herein, however, not all of this detection distance can be realized with a simple matched filter and threshold approach because a sequence of symbols does not produce an isolated response. For some possible sequences of symbols, the detection distance is reduced significantly from that achieved by an isolated response. As further recognized herein, the detector generally is not a continuous time system, but rather is a sampled system to render advantages that are not easily implemented in a continuous time system, and unless the read back signal is sampled synchronously, additional variations will be present in the matched filter output due to variations in sampling phase. The result is that for some configurations of the biphase matched filter, the loss of detection distance for the worst case sequence compared to that achieved by an isolated response can be quite pronounced. Even if a Viterbi algorithmi is applied to the read back signal to resolve detector decisions and thereby improve performance, the present invention critically observes that to guarantee accurate sampling phase, a sampled system typically requires a longer synchronization field prior to the servo data fields, and that the synchronization field consumes valuable disk area. Furthermore, a synchronously sampled system must be properly equalized to accurately resolve detector decisions. To further complicate the system, the equalization must be dynamically adjusted as the linear density changes from the inner diameter to the outer diameter of the disk, resulting in a system which is difficult to setup, susceptible to error due to misequalization, and generally user unfriendly. Having made the above critical observations, the invention herein is provided.

SUMMARY OF THE INVENTION

The invention described herein uses biphase encoding with a plurality of matched filters to achieve enhanced detection distance without the need for synchronous sampling and equalization and without the need to apply a Viterbi algorithm to the read back signal. Because the biphase pattern contains only two different magnet lengths for all possible symbol sequences, it is possible to use as few as two matched filters to identify the different symbol sequences, although more than two filters can be used.

Accordingly, a hard disk drive (HDD) includes at least one disk storing data using a biphase pattern. A plurality of matched filters are provided that are useful for detecting binary data represented by the biphase pattern without the need for synchronous sampling or equalization.

In non-limiting embodiments the pattern establishes plural detection cells, with each detection cell including "n" samples. The matched filters are sampled at a rate of "n" times the period of a detection cell, wherein "n" is an integer. The biphase pattern may represent servo data, and no Viterbi algorithm need be applied to the read back signal.

In illustrative implementations, the matched filters are part of a circuit outputting a signal from one and only one of the matched filters, on the basis of which matched filter produces a largest detection distance for an input sequence of biphase magnetic signals. One matched filter may be a 4-length (4L) matched filter and the other matched filter may be an 8-length (8L) matched filter. The 4L matched filter can be configured for optimizing output for the biphase sequences 1,1 and 0,0, while the 8L matched filter can be configured for optimizing output for the biphase sequences 0,1 and 1,0. In a more complex circuit, the 4L matched filter may be configured for optimizing output for the biphase sequences 111, 110, 000, and 001 and the 8L matched filter may be configured for optimizing output for the biphase sequences 011, 010, 100, and 101.

In another aspect, a chip that is configured for placement within a hard disk drive (HDD) having at least one disk includes means for producing a matched signal for a first sequence of expected biphase signals from a read head in the HDD, and means for producing a matched signal for a second sequence of expected biphase signals from a read head in the HDD. The chip also includes means for selecting an output of one and only one of the producing means.

In still another aspect, a method includes receiving a read back signal representing a biphase pattern on a disk, and processing the signal through at least first and second matched filters configured differently from each other. The filters output respective first and second values. The method includes selecting a largest of the first and second values without synchronous sampling and without equalization.

The details of the present invention, both as to its structure and operation, can best be understood in reference to the

BRIEF DESCRIPTION OF THE DRAWINGS

FIG. 4 is a schematic diagram of another exemplary pair of matched filters.

DETAILED DESCRIPTION OF THE PREFERRED EMBODIMENT

Figure 1:
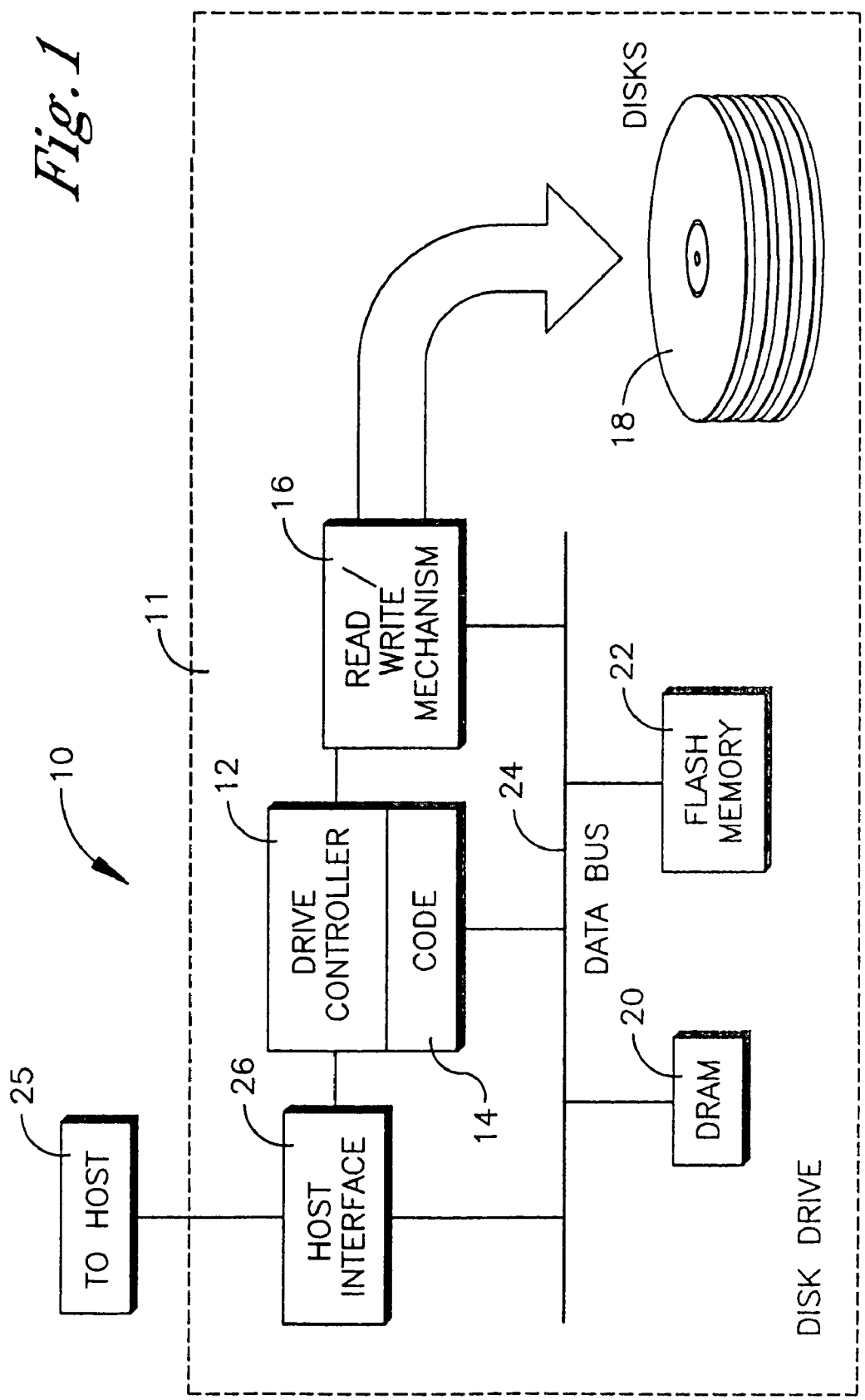
FIG. 1 is a block diagram of an exemplary non-limiting hard disk drive (HDD)

Referring initially to FIG. 1, an illustrative non-limiting hard disk drive (HDD) is shown, generally designated 10, having a housing 11 holding a hard disk drive controller 12 that can include and/or be implemented by a microcontroller. The controller 12 may access electronic data storage in a computer program device or product such as but not limited to a microcode storage 14 that may be implemented by a solid state memory device. The microcode storage 14 can store microcode embodying logic.

The HDD controller 12 controls a read/write mechanism 16 that includes one or more heads for writing data onto one or more disks 18. Non-limiting implementations of the HDD 10 include plural heads and plural disks 18, and each head is associated with a respective read element for, among other things, reading data on the disks 18 and a respective write element for writing data onto the disks 18. The matched filters described below can be contained or embodied in logic in the controller 12, or they may be contained in the read/write mechanism 16, or they may be implemented in other aspects of the HDD 10 as appropriate.

If desired, the HDD controller 12 may communicate with one or more solid state memories such as a Dynamic Random Access Memory (DRAM) device 20 and a flash memory device 22 over an internal HDD bus 24. The HDD controller 12 can also communicate with an external host computer 25 through a host interface module 26 in accordance with HDD principles known in the art.

Figure 2:
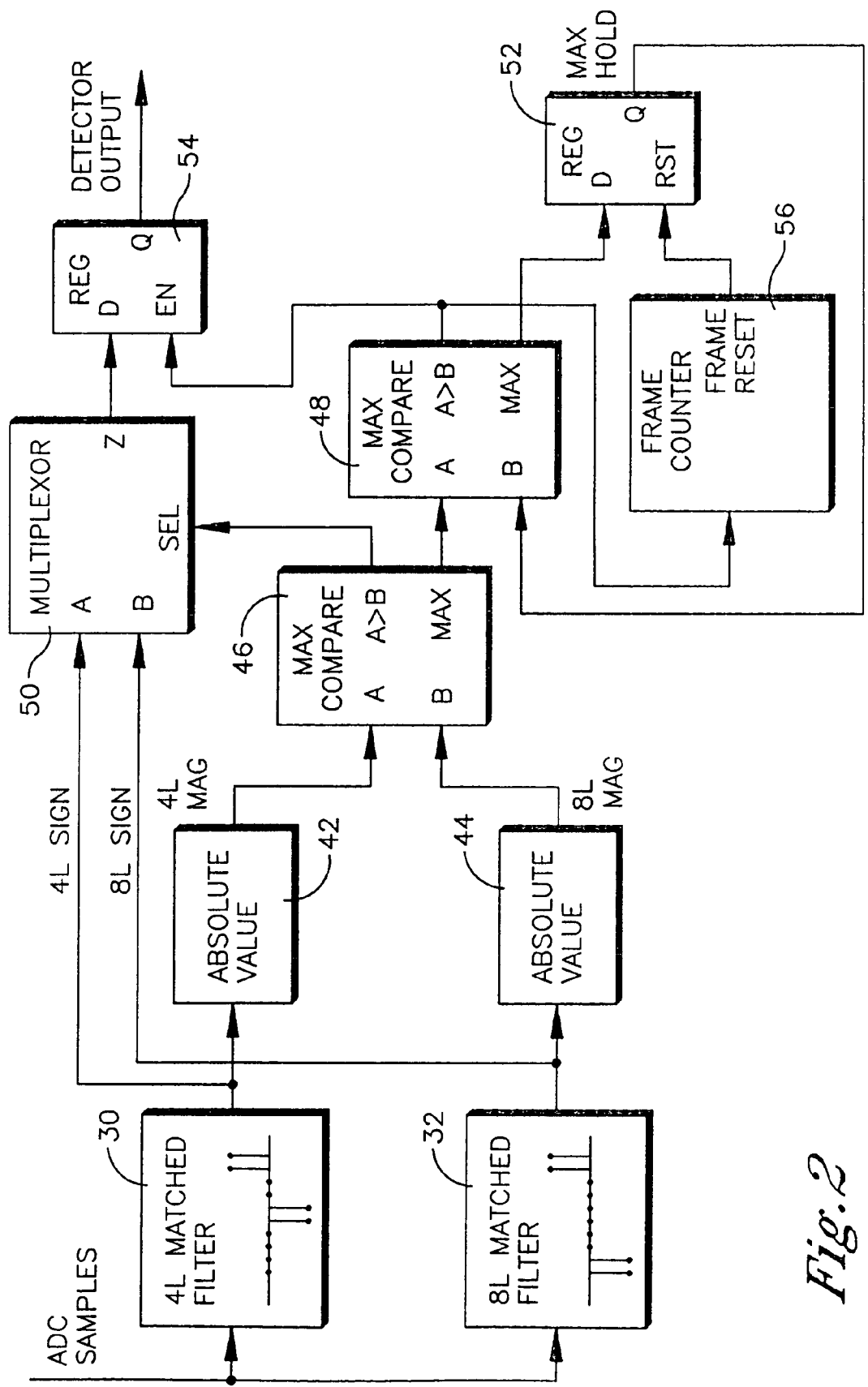
FIG. 2 is a block diagram of one implementation of the present multi-matched filter circuit.

Now referring to FIG. 2, a block diagram of an exemplary filter circuit is shown. The read back signal from the disk 18, after having been digitized by an analog to digital converter, can represent servo data or informational (non-servo) data. The read back signal is sampled and passed into both a 4L matched filter 30 and an 8L matched filter 32 at a sample rate of, e.g., eight times the period of the detection cell. That is, each detection cell includes eight samples, with the matched filters 30, 32 each representing a respective expected sample amplitude.

Figure 3:
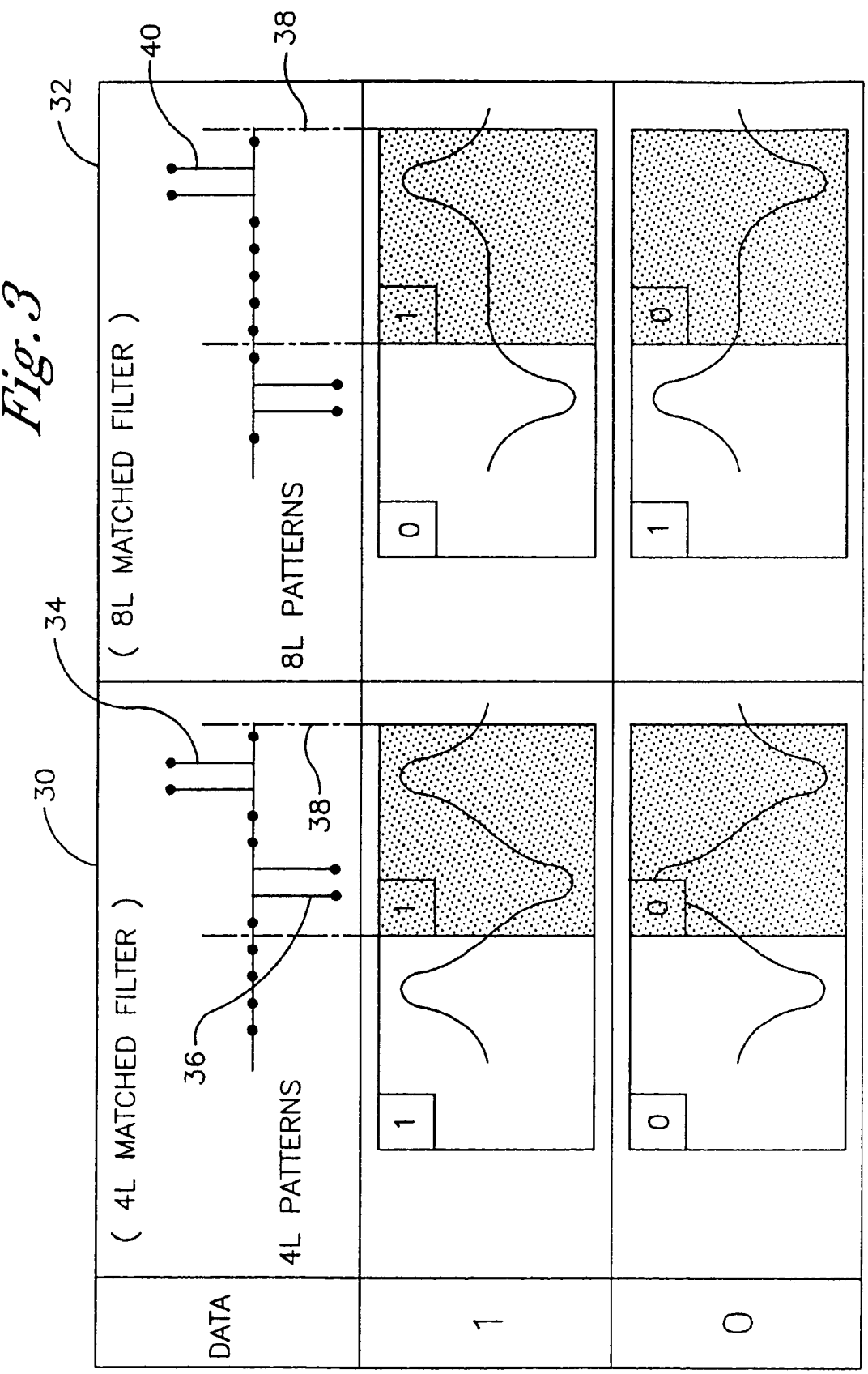
FIG. 3 is a schematic diagram of one exemplary pair of matched filters.

Referring briefly to FIG. 3, the 4L matched filter 30 includes a pair of positive filter taps 34 and a pair of negative filter taps 36 within a single detection cell 38. As shown, the negative taps 36 have amplitudes of the same magnitude as the amplitudes of the positive taps 34, but with opposite polarities. That is, a 4L filter expects to find two non-zero pulses of the same magnitude and different polarities in the read back signal in a single detection cell. Thus, the exemplary 4L filter 30 shown in FIG. 3 is configured to optimize output for the biphase sequences 1,1 (corresponding to a binary "1") and 0,0 (corresponding to a binary "0") as shown. Accordingly, a positive matched filter output indicates a binary "1" while a negative matched filter output indicates a binary "0".

In contrast, the 8L filter 32 has, in a single detection cell 38, only one pair of filter taps 40 of a particular amplitude, although as discussed further below in reference to FIG. 4, an 8L filter can have a second pair of taps albeit at a different amplitude than the first pair. In any case, an 8L matched filter expects to find only a single non-zero pulse of a particular magnitude in a detection cell, i.e., to find two non-zero pulses that span two cells. Accordingly, the non-limiting 8L matched filter 32 shown in FIG. 3 is configured to optimize output for the biphase sequences 0,1 (corresponding to a binary "1") and 1,0 (corresponding to a binary "0") as shown.

Returning to FIG. 2, the absolute values of the outputs of the matched filters 30, 32, respectively are determined at absolute value calculators 42, 44 and sent to a first maximum comparator 46 for comparison. The first maximum comparator 46 determines which matched filter output has the largest magnitude and sends this value to a second maximum comparator 48. Also, if the output of the 4L matched filter 30 has the largest magnitude, a select signal is sent from the first comparator 46 to a multiplexer 50, which receives both signs of the output signals of the filters 30, 32 and which propagates the sign of the 4L matched filter. Otherwise, in the absence of a select signal the multiplexer 50 propagates the sign of the 8L matched filter 32.

The second maximum comparator 48 performs a maximum hold function by comparing the largest magnitude of the current sample to the largest magnitude from previous samples in the current detection cell, and then causing the result to be stored in a maximum hold register 52, which value can be returned to the second maximum comparator 48 for subsequent comparisons. The value in the register 52 is updated each time the magnitude of the current sample is larger than the stored value. Also, when a new maximum is found, both the sign of the corresponding matched filter and its value is stored in a detector output register 54. The output of the register 54, both as to sign and value, represents the value of the signal and, hence, is sent on to, e.g., to the servo control loop, which may be contained on a servo processor or on microcode in the controller 12.

The boundary of a detection cell is established by a frame counter 56, which receives as input the output of the second maximum comparator 48 and which sends a reset signal to the register 52 to reset the value in the register 52 at the beginning of a new detection cell. In accordance with the exemplary circuit shown, the detected data is framed within the center of the detection cell by the frame counter 56, which implements a simple timing loop. Ideally, the maximum value for a given detection cell should occur in the center of the cell. When the maximum value does not occur in the center of the cell, this represents a timing error. The frame counter 56 accumulates these errors until they become relatively large, at which point the frame counter 56 adjusts the framing by one sample. Even in the presence of timing error, the circuit shown in FIG. 2 outputs its value based on the maximum matched filter output over a range of samples within the cell. This method of detection and data framing provides good performance in the presence of timing error and intersymbol interference. For this reason, the circuit shown in FIG. 2 does not require complicated equalization that is commonly used in synchronously sampled systems.

As mentioned previously, FIG. 3 illustrates two non-limiting matched filters 30, 32 and the corresponding biphase pattern types for which each is optimized. As shown, each detection cell 38 may consist of eight samples such that the matched filters 30, 32 are over-sampled at a rate of eight times the period of the detection cell.

FIG. 4 illustrates another non-limiting embodiment having a 4L matched filter 60 that is configured to find the middle bit in the biphase sequences 111, 110, 000, and 001, and an 8L matched filter 62 configured to find the middle bit in the biphase sequences 011, 010, 100, and 101. The filters 60, 62 shown in FIG. 4 are more complex matched filters than those shown in FIG. 2, and they correlate with more of the biphase pattern over the set of all possible symbol sequences. As shown, the 4L filter 60 has two pair of filter taps in a single detection cell 64, with the taps of one pair having equal amplitudes and opposite polarities to those of the other pair. Also, the 4L filter 60 shown in FIG. 4 has a pair of smaller (but non-zero) amplitude taps bounding each side of the detection cell 64. On the other hand, the 8L filter 62 has one pair of high amplitude taps and one pair of medium amplitude taps (which may but not must be the same amplitude as the "smaller taps of the 4L filter) in a detection cell, each having a first polarity, with the detection cell being bounded by opposite polarity high and medium taps as shown.

In summary, the present invention realizes the advantages of the biphase pattern without requiring synchronous sampling and equalization. Because both biphase symbols carry energy, there is more timing content and greater detection distance for better SNR. The matched filters have notches at DC and the pattern itself is DC free. Because the decision threshold is zero, the detector is also insensitive to gain variation. These advantages translate into a detector that performs better, is more format efficient, and provides the ease of use of an asynchronously sampled system.

While the particular BIPHASE MAGNETIC PATTERN DETECTOR USING MULTIPLE MATCHED FILTERS FOR HARD DISK DRIVE as herein shown and described in detail is fully capable of attaining the above-described objects of the invention, it is to be understood that it is the presently preferred embodiment of the present invention and is thus representative of the subject mater which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

We claim:

1. A hard disk drive (HDD), comprising:
at least one disk storing data using a biphase pattern; and
a plurality of matched filters useful for detecting binary data represented by the biphase pattern without the need for synchronous sampling or equalization.

2. The HDD of claim 1, wherein the pattern establishes plural detection cells, with each detection cell including "n" samples, the matched filters being sampled at a rate of "n" times the period of a detection cell, wherein "n" is an integer.

3. The HDD of claim 1, wherein the biphase pattern represents servo data, and no Viterbi algorithm is applied to a read back signal representing the pattern.

4. The HDD of claim 1, wherein the matched filters are part of a circuit outputting a signal from one and only one of the matched filters, on the basis of which matched filter produces a largest detection distance for an input sequence of biphase magnetic signals.

5. The HDD of claim 4, wherein one matched filter is a 4L matched filter and the other matched filter is an 8L matched filter.

6. The HDD of claim 5, wherein the 4L matched filter is configured for optimizing output for the biphase sequences 1,1 and 0,0.

7. The HDD of claim 5, wherein the 4L matched filter is configured for optimizing output for the biphase sequences 111, 110, 000, and 001.

8. The HDD of claim 5, wherein the 8L matched filter is configured for optimizing output for the biphase sequences 0,1 and 1,0.

9. The HDD of claim 5, wherein the 8L matched filter is configured for optimizing output for the biphase sequences 011, 010, 100, and 101.

10. A chip configured for placement within a hard disk drive (HDD) having at least one disk, the chip comprising:
means for producing a matched signal for a first sequence of expected biphase signals from a read head in the HDD;
means for producing a matched signal for a second sequence of expected biphase signals from a read head in the HDD; and
means for selecting an output of one and only one of the means for producing.

11. The chip of claim 10, wherein the means for producing a matched signal for a first sequence is a first matched filter, the means for producing a matched signal for a second sequence is a second matched filter, and the means for selecting includes a first maximum comparator.

12. The chip of claim 11, further comprising:
respective absolute value calculators receiving signals from the matched filters and sending outputs to the first maximum comparator for comparison thereof, to thereby determine which matched filter output has the largest magnitude.

13. The chip of claim 12, further comprising a second maximum comparator receiving an output from the first maximum comparator and a multiplexer receiving a select signal from the first maximum comparator, the multiplexer propagating a sign of the output of the matched filter having the largest magnitude.

14. The chip of claim 13, wherein the second maximum comparator compares the largest value received from the first maximum comparator with a current sample in a first register, and outputs a signal to the first register.

15. The chip of claim 14, further comprising a second register holding a sign and value to be output.

16. The chip of claim 15, further comprising a frame counter defining a detection cell.

17. A method, comprising:
   receiving a read back signal representing a biphase pattern on a disk;
   processing the signal through at least first and second matched filters configured differently from each other, the filters outputting respective first and second values; and
   selecting a largest of the first and second values without synchronous sampling and without equalization.

18. The method of claim 17, wherein the pattern represents disk servo data, and no Viterbi algorithm is used to process the read back signal.

19. The method of claim 17, comprising outputting a largest value in a detection cell.

* * * * *